(12) United States Patent  
Riemers

(10) Patent No.: US 9,792,384 B2
(45) Date of Patent: Oct. 17, 2017

(54) REMOTE RETREIVAL OF DATA FILES

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 1185 days.

(21) Appl. No.: 12/393,963

(22) Filed: Feb. 26, 2009

(65) Prior Publication Data

US 2010/0228737 A1 Sep. 9, 2010

(51) Int. Cl.
*G06F 17/30* (2006.01)

(52) U.S. Cl.
CPC .............................. *G06F 17/30902* (2013.01)

(58) Field of Classification Search
CPC .................................................. G06F 17/30902
See application file for complete search history.

(56) References Cited

U.S. PATENT DOCUMENTS

| | | | | |
|---|---|---|---|---|
| 5,842,216 A * | 11/1998 | Anderson | ............ | H04L 1/1678 |
| 6,098,079 A * | 8/2000 | Howard | | |
| 6,119,167 A * | 9/2000 | Boyle | ............ | H04L 12/18 |
| | | | | 709/203 |
| 6,487,641 B1 * | 11/2002 | Cusson et al. | ............... | 711/144 |
| 7,680,998 B1 * | 3/2010 | Auchmoody | ..... | G06F 17/30191 |
| | | | | 707/648 |
| 7,900,002 B2 * | 3/2011 | Lyon | .................. | G06F 11/1453 |
| | | | | 707/640 |
| 8,019,882 B2 * | 9/2011 | Rao et al. | ..................... | 709/230 |
| 2002/0038296 A1 * | 3/2002 | Margolus et al. | ................ | 707/1 |
| 2002/0083053 A1 * | 6/2002 | Richard et al. | .................. | 707/3 |
| 2002/0094085 A1 * | 7/2002 | Roberts | ................. | H04L 9/0869 |
| | | | | 380/262 |
| 2005/0100166 A1 * | 5/2005 | Smetters | ............ | H04L 63/0492 |
| | | | | 380/277 |
| 2005/0131900 A1 * | 6/2005 | Palliyll et al. | .................. | 707/10 |
| 2005/0132184 A1 * | 6/2005 | Palliyil | .................. | G06F 21/56 |
| | | | | 713/152 |
| 2005/0138081 A1 * | 6/2005 | Alshab | ................... | G06Q 10/06 |
| 2005/0240989 A1 * | 10/2005 | Kim | .................... | H04L 63/0254 |
| | | | | 726/11 |
| 2006/0010095 A1 * | 1/2006 | Wolff et al. | ....................... | 707/1 |
| 2006/0149806 A1 * | 7/2006 | Scott et al. | ................... | 709/201 |
| 2006/0184652 A1 * | 8/2006 | Teodosiu et al. | ............. | 709/221 |

(Continued)

OTHER PUBLICATIONS

Teodosiu et al. "Optimizing File Replication over Limited-Bandwidth Networks using Remote Differential Compression", 2006 Microsoft Corporation.*

(Continued)

*Primary Examiner* — Polina Peach
(74) *Attorney, Agent, or Firm* — Lowenstein Sandler LLP

(57) ABSTRACT

A method and apparatus that include a hashing and retrieval module that receives an indicator of a portion of a file to access, generates a hash value of a local copy of the portion and generates a request for a remote copy of the portion of the file, the request including the hash value. A verification and response module receives the request for a portion of a server copy of a data file, the request including a first hashing value. The verification and response module retrieves the portion from a server storage device, generates a second hashing value from the portion, compares the first hash value and the second hash value and returns the portion of the file in response to a failed comparison of the first hash value and second hash value.

18 Claims, 4 Drawing Sheets

(56) References Cited

U.S. PATENT DOCUMENTS

| | | | |
|---|---|---|---|
| 2008/0034021 A1* | 2/2008 | De Spiegeleer | 707/204 |
| 2008/0244030 A1* | 10/2008 | Leitheiser | 709/211 |
| 2009/0019530 A1* | 1/2009 | Keeler | H04L 9/3226 726/4 |
| 2009/0196296 A1* | 8/2009 | Vachuska | 370/395.32 |
| 2009/0271779 A1* | 10/2009 | Clark | 717/171 |
| 2010/0064354 A1* | 3/2010 | Irvine | G06F 21/6218 726/5 |
| 2010/0077468 A1* | 3/2010 | Pragides | G06F 17/30572 726/7 |
| 2010/0217972 A1* | 8/2010 | Lohiniva | G07C 9/00103 713/153 |
| 2011/0055904 A1* | 3/2011 | Tsutsumi | G06F 21/10 726/4 |
| 2015/0199414 A1* | 7/2015 | Braginsky | G06F 17/30132 707/613 |

OTHER PUBLICATIONS

Fielding, R., et al.; "Hypertext Transfer Protocol—HTTP/1.1"; Standards Track; Jun. 1999; 114 pages.
Match Continuation; http://zsync.moria.org.uk/paper/ch02s04.html.

* cited by examiner

REMOTE RETREIVAL OF DATA FILES

TECHNICAL FIELD

Embodiments of the present invention relate to a method and system for data retrieval. Specifically, the embodiments of the invention relate to a method and system for retrieving a specified portion of a data file when a hash value of a local copy is inconsistent with the hash value of the remote copy.

BACKGROUND

Many different types of networked computing systems support the remote retrieval of data files. These data files are offered by a remote server to a set of local clients. The local clients download the data files and maintain local copies of the data files. After downloading the data file the local client may periodically access that local copy of the data file, but the copy on the remote server may have changed since the last access. If the local client seeks to utilize the most current version of the data file, then the local client will check with the remote server to determine whether the data file is current each time it is needed. To avoid having to re-load the file, a request is sent to the remote server with the time stamp of the local copy which is then utilized to determine whether or not the remote copy is identical to the local copy. The time stamp of the local copy is compared with the time stamp of the remote copy and if they match it is assumed that the two files are identical. In this manner, downloading the remote copy can be avoided and the resources necessary to obtain the remote copy do not have to be tied up.

Similar systems utilize checksums in place of time stamps. The checksum is obtained by processing a data file to obtain a value that is relatively small in size but is essentially unique to the file that it is generated from. In other words, a checksum function is unlikely to generate the same result value on any two data inputs regardless of the size or the variation between the two. These checksum values have been utilized in place of the time stamp by creating a checksum value for a local copy and sending it to the server where it is compared with the remote copy. If the two match then it can be assumed that the remote copy and the local copy are identical. If they do not match then the remote copy is sent to the requestor.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

A local application generates a request for a portion of a data file that is located primarily on a remote storage device. A hashing and retrieval module checks a local storage device for the data file that includes the portion identified by the local application. The hashing and retrieval module then generates a hash value for the portion of the data file that has been requested and sends a request to a remote server that hosts a verification and response module, where the request includes the generated hash value. The verification and response module then compares the received hash value with a hash value generated using the requested portion of the data file in the remote storage device. If the hash value is matched, a response is sent back to the client machine indicating that the local data file portion is up to date. If there is not a match, then the verification response module initiates the sending of the requested portion of the data file.

Figure 1:
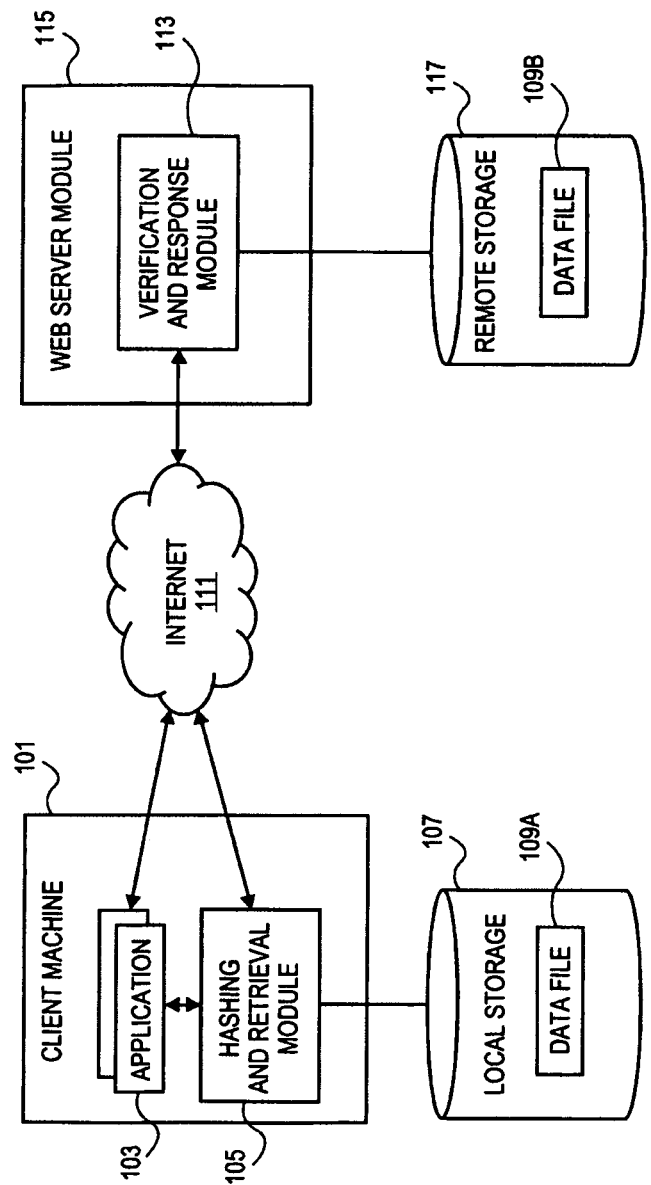
FIG. 1 is a diagram of one embodiment of the data retrieval system.

FIG. 1 is a diagram of one embodiment of the data retrieval system. The system includes at least one client machine 101, at least one server machine 115 and a network 111. The system may be compatible with any number of client machines 101 and server machines 115. Each client machine 101 and server machine 115 can in turn, depending on the context, serve as a client or server allowing bi-directional use of the data retrieval system between any two machines or any combination or number of machines. The data retrieval system has been described with regard to FIG. 1, which illustrates a data retrieval system with a single client machine and single server machine for sake of clarity. One of ordinary skill in the art would understand that the principles and structures described herein can be applied to any number or combination of machines.

The client machine 101 can be a desktop computer, laptop computer, work station, console device, handheld device or any other type of computing device. The client machine 101 can execute any number of applications 103. The applications 103 can be any type of application that may utilize remotely stored data files including a browser, business application, entertainment application (e.g., a video game or media player) or similar application. Any number of applications 103 can be executing on the client machine 101 and participate in the data retrieval system.

In one embodiment, the client machine 101 includes a hashing and retrieval module 105. The hashing and retrieving module 105 can be a stand-alone component and can be implemented as a hardware device, software program or combinations thereof. In other embodiments, the hashing and retrieval module 105 can be incorporated into an application or further divided into multiple components (e.g., dividing the module into a hashing function and a retrieval function). The hashing and retrieval module 105 receives a request for a portion of a data file. The hashing and retrieval module 105 then determines whether or not the requested portion of the data file is available in the local storage data device 107. A 'portion' of a data file, as used herein, refers to any size segment of a data file that is less than the whole of the file 109A. If the requested data is available locally, then a check is made to determine whether or not the requested portion of the data file 109A is up to date or identical with a remotely stored portion of the data file 109B. If the local portion of the data file 109A is up to date and identical with the same portion of the remote data file 109B, then the local data file 109A is utilized to minimize the resources required by the client machine and the data retrieval system as a whole, such as bandwidth requirements on the network 111.

The local storage device 107 can be any type of persistent storage device including a fixed disk, optical disk, removable disk drive, static memory, flash memory or similar persistent storage device. The data file 109A can be any type of data file for storing any type of data in any format. The data can be any part of a hyper-text markup language document, an extensible mark-up language document, a flat database record or similar data file. The locally stored data file 109A can be any type of binary data, image data, HTML data, XML data, database data, file data or similar data stored in similar data structures. The hashing and retrieval module 105 can manage the retrieval of any number of data portions of any number of data files 109A stored on local storage device 107 or any number of local storage devices.

The network 111 can be any type of network including a local area network (LAN), a wide area network (WAN) (e.g, the Internet) or similar network infrastructure. It can include any number of networking devices and endpoint computers. The networking devices and computers can be connected through any number and combination of wired or wireless links.

The server machine 115 can be any type of machine including a desktop computer, a laptop computer, a work station, a server, a handheld device, a console device or a similar computer. The server machine 115 can also be capable of supporting any type of communication protocol such as the hyper-text transfer protocol (HTTP), file transfer protocol (FTP) or similar protocol over which data is exchanged. For example, in one embodiment the server 115 is a web server. The server machine 115 includes a verification and response module 113. The verification and response module 113 processes requests received from the hashing and retrieval module 105 on the client machine 101. The requests from the hashing and retrieval module 105 can include an identifier such as a uniform resource indicator (URI) for a data file, an identifier for a portion of that file (e.g., a segment or record within the data file) and a hashing value for the portion of the file that has been requested. The verification and response module 113 provides functionality that is described in greater detail below in regard to FIG. 3. The verification and response module 113 retrieves the requested portion of the data file 109B from the remote storage device 117. The verification and response module 113 generates a hashing value for the retrieved data. The verification and response module 113 then performs a comparison of the hashing value for the retrieved portion with the hashing value that was received in a request from the client machine 101. If the hashing values match, then a simple response can be returned indicating that the two hash values match thereby implicitly indicating that the requested data portion is current or valid in the local data file 109A. In this case, a portion of the data file that has been requested does not need to be returned thereby minimizing the resources required by a server machine 115 (e.g., processing and bandwidth resources).

The remote storage device 117 can be any type of persistent storage device including a fixed disk, an optical disk, a magnetic disk, a removable disk drive, flash device, static memory device or similar storage device. The remotely stored data file 109B can be any type of binary data, image data, HTML data, XML data, database data, file data or similar data stored in similar data structures. The verification and response module 105 can manage the retrieval of any number of data portions of any number of data files 109B stored on the remote storage device 117 or any number of remote storage devices.

Figure 2:
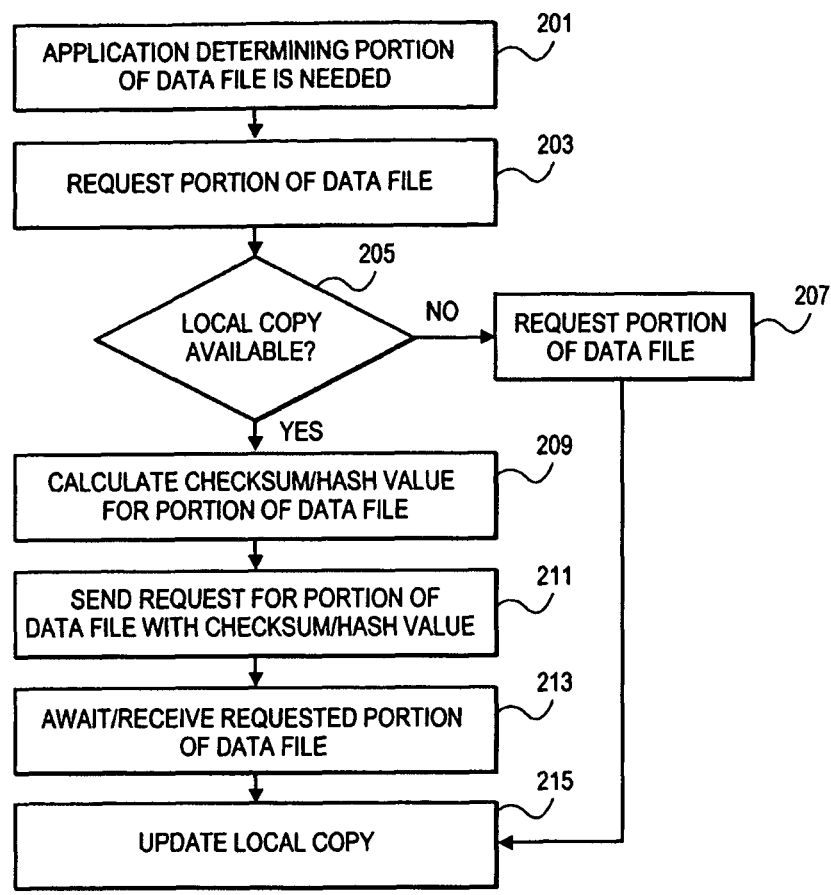
FIG. 2 is a flowchart of one embodiment of the process of the client side of the data retrieval system.

FIG. 2 is a flowchart of one embodiment of a process for requesting data retrieval. In one embodiment, the process is initiated by an application determining that a portion of a data file is needed (Block 201). Any type of application can generate a request for any size of a data file or a portion of a data file. The components of the invention can process any number of requests for data concurrently or serially. A process for handling a single request is set forth herein for sake of clarity. One of ordinary skill in the art would understand that the principles and structures described herein are applicable to a system for servicing any number of such requests. The portion of the data file that is requested by the application can be specified by any type of identifier including a URI and a range of bytes within a data file associated with the UIR. Any addressing scheme or identification scheme for specifying the data file and the specific portion of a data within the data file can be utilized.

The hashing and retrieval module receives and processes the request from the application (block 203). The application can call the hashing and retrieval module, send a message or similarly initiate the hashing and retrieval module. In response to the receiving the data request, the hashing and retrieval module determines whether a local copy of the portion of the data file that has been requested is available (Block 205). If the data is not available locally, then the process requests that portion of the data file from the remote server that stores the original data file, such as a web server or similar server (Block 207). The hashing and retrieval module or similar component of the client machine generates the request. The client machine then awaits receipt of the requested portion of the data file from the server (Block 213). In one embodiment, if the data file has not been previously accessed then the whole of the file may be retrieved or any portion of the file that includes the requested portion can be retrieved (Block 213). Once the requested data file or portion of the data file has been received the local storage device is updated to store the data file or portion of the data file that has been received (Block 215).

In the case where a local copy is available, the specified portion of the data file is retrieved by the hashing and retrieval module. The hashing and retrieval module then calculates a checksum or similar hash value for that portion of a data file (Block 209). Any checksum generation function or hash function (more specifically referred to as cryptographic hash functions) can be applied to the data that has been retrieved. For example, checksum and hashing functions include MD5, message authentication codes (MACs), and similar checksum and hashing functions. Once the hashing value has been generated, a request is generated to be sent to the server to verify that the retrieved local copy of the portion of the data file is consistent with the original file at the server. The hashing value is included in the request, which is then sent to the server (Block 211). Any type of data request or data transfer protocol can be utilized to generate the request. For example, the request can be made as an HTTP request, FTP request or a similar type of data transfer protocol. A new transfer protocol or an existing transfer can be designed or updated to support the sending of the hashing value or similar value by including a special request type or a specific data field in an existing a request. In other embodiments, existing data fields and requests can be utilized by repurposing them. For example, a specific request type can be used to send the hashing value by utilizing a data field that is not intended for storing the hashing value, but can be utilized for this purpose without causing a problem with the protocol.

Once the request has been sent, then the client machine awaits the reception of the requested data (Block 213). The response will be in the format of the selected transfer protocol. The server can send an acknowledgement or response message indicating that the local copy of the requested data is current or valid. The server can also send the requested portion of the data file if the local of the requested data is not current or valid. In one embodiment, the server sends a message indicating that the local copy of the portion of the data file is not current or valid prior to the sending of the portion of the data file that has been requested. If the portion of the data file that has been requested is received in the response, it can be utilized to update the local copy of the data file 109A (Block 215). If an acknowledgement message indicating that the local copy is current or valid is received, then meta data or similar data can be updated in the local storage device indicating that the local copy of the data has been recently verified, which could be utilized to avoid re-requesting the data.

Figure 3:
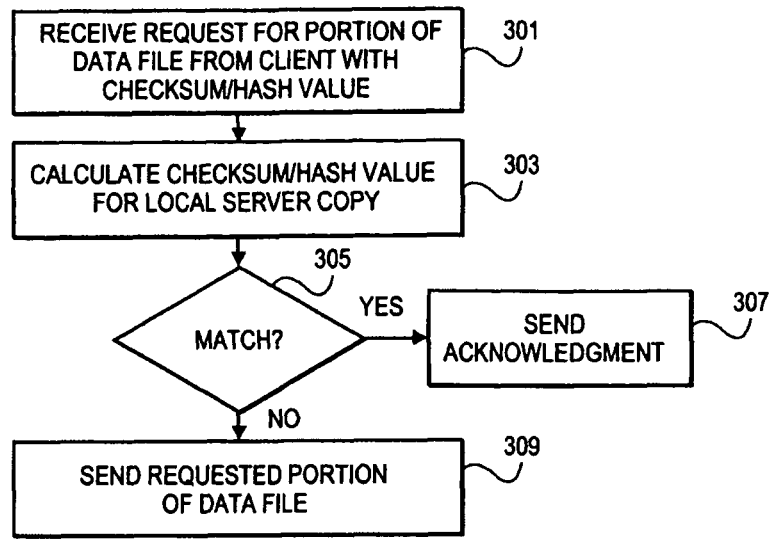
FIG. 3 is a flowchart of one embodiment of the process of the server side of the data retrieval system.

FIG. 3 is a flowchart of one embodiment of a process for handling a data retrieval request. In one embodiment, the process is executed by a verification and response module on a server machine. The process can be initiated by receiving a request for a portion of a data file from a client that includes a checksum or similar hashing value (Block 301). The protocol for the request can be any type of protocol that is utilized to transfer data files. The server machine can support multiple transfer protocols that each implement the data retrieval system including existing transfer protocols that were not specifically designed to implement the use of the hashing value to verify local data. In one embodiment, the HTTP protocol can be utilized using a field of the HTTP protocol 1.2 to carry the hashing value. Then a program on the server side (e.g., the verification and response module) identifies the hashing value and performs the verification by comparing the hash value with a hash value derived from the server copy of a requested portion of a data file. The verification and response module can be implemented as any type of a script or program such as a Python, Perl, common gateway interface (CGI) script or similar type of server side implemented script or program.

Once the request is received and the local server copy of the portion of the data file has been retrieved from the remote storage device, the checksum or hash value for the server copy of the requested portion of the data can be calculated. The verification response module and hashing retrieval module utilize the same hashing function or check sum function to ensure the hashing of identical values generates the same hashing value. In some embodiments, a hashing function that utilizes a specific seed that is known and shared between the client and the server can be utilized to increase the likelihood that the comparison is accurate, because there is always a small chance with hashing functions that the same hashing value can be generated using two different inputs. In one embodiment, multiple hash seeds can be utilized or hash seeds can be alternated or similarly changed to further minimize the likelihood of false positive matches. If the match of the hashing value is found (Block 305), then the verification and response module can send an acknowledgement (Block 307). The acknowledgment format and content can be based on the requirements of the protocol that is utilized. Some protocols that can be utilized do not require an explicit acknowledgement be sent; instead a failure to acknowledge or a timeout may be utilized on the client side to determine that the local copy is current or valid and can be utilized. If a match is not found (Block 305), then the requested data is prepared for transfer according to the shared protocol between the client and the server (Block 309).

Figure 4:
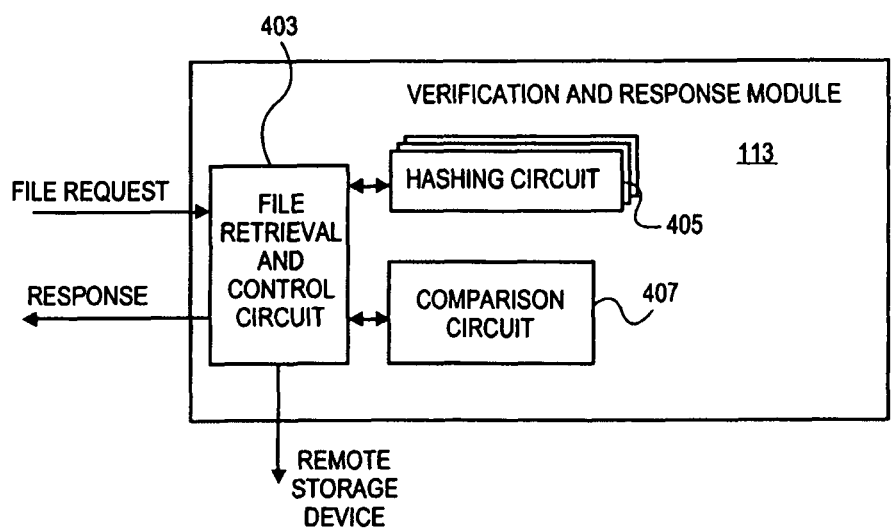
FIG. 4 is a diagram of one embodiment of a verification and response module.

FIG. 4 is a diagram of one embodiment of a verification and a response module. In one embodiment, the verification and response module 113 is implemented as a series of modules that can be software components, hardware (e.g., circuits) or any combination thereof. This embodiment has been described in regard to a set of inter-related circuits. However, one of ordinary skill in the art would understand that the functions and the structures described herein can be configured as a single monolithic circuit or further subdivided into smaller circuits with more discrete functionality. Similarly, these circuits could be implemented as software or as any combination of hardware and software, e.g., in the form of micro-coded hardware devices.

The verification and response module 113 can include a file retrieval and control circuit 403, a hashing circuit 405 and a comparison circuit 407. The file retrieval and control circuit 403 receives a data request that was generated by the client machine or a message derived from that request. The file retrieval and control circuit 403 then retrieves the identified portion of the data file from the remote storage device by parsing the request and then identifying the URI or similar identifier in the request. This URI or similar identifier is utilized to find a matching data file in a remote storage device and to retrieve the identified portion. The identifier can include multiple aspects including a data file identifier and a byte range identifier. Once the file retrieval and control circuit 403 has obtained the requested portion of the data file it can then pass this data to the hashing circuit 405.

The hashing circuit 405 receives the data portion and performs a specific or specified hashing function. The hashing circuit 405 may be one of several hashing circuits that each perform a different type of hashing function or a monolithic circuit that is able to perform multiple different types of hashing functions. The selected hashing circuit 405 will be the same hashing function that is utilized by the hashing and retrieval module on the client machine. This can be determined inherently by an identifier of the client machine, the type of protocol utilized or can be explicitly included in the request sent by the client machine. The selection of the hashing circuit can also include the selection of a seed for the hashing circuit 405. To decrease the chance of false positives on matches, a seed can be utilized and shared between the server and the client. The seed can be pre-set or implicitly or explicitly derived from the request. Once the hashing is completed, the hashing value is returned to the file retrieval and control circuit.

The file retrieval and control circuit 403 then calls the comparison circuit 407. The comparison circuit 407 can be any type of data comparison circuit such as comparator or similar structure. The comparison circuit 407 either retrieves the hashing values to be compared from a known location or is provided the hashing values by the file retrieval and control circuit 403. The comparison circuit 403 compares the hashing value generated by the hashing circuit 405 and the hashing value received in the request to determine whether they match. If the values are a match, then comparison circuit 407 returns a positive match indicator. If no match is found, then comparison circuit 407 returns a failed match indicator to the file retrieval and control circuit 403.

The file retrieval and control circuit 403 utilizes this indicator to determine the type of response to be sent to the client machine. If the match is successful, then a simple response acknowledging the successful match or similar response is sent to the client machine indicating that the remote data file does not need to be sent to the client machine and the client machine may use its local copy because it is current or valid. If however, there was not a match, then the file retrieval and control circuit 403 accesses the remote storage device to retrieve the server copy of the requested portion of the data file to send to the client machine using the shared transfer protocol.

Figure 5:
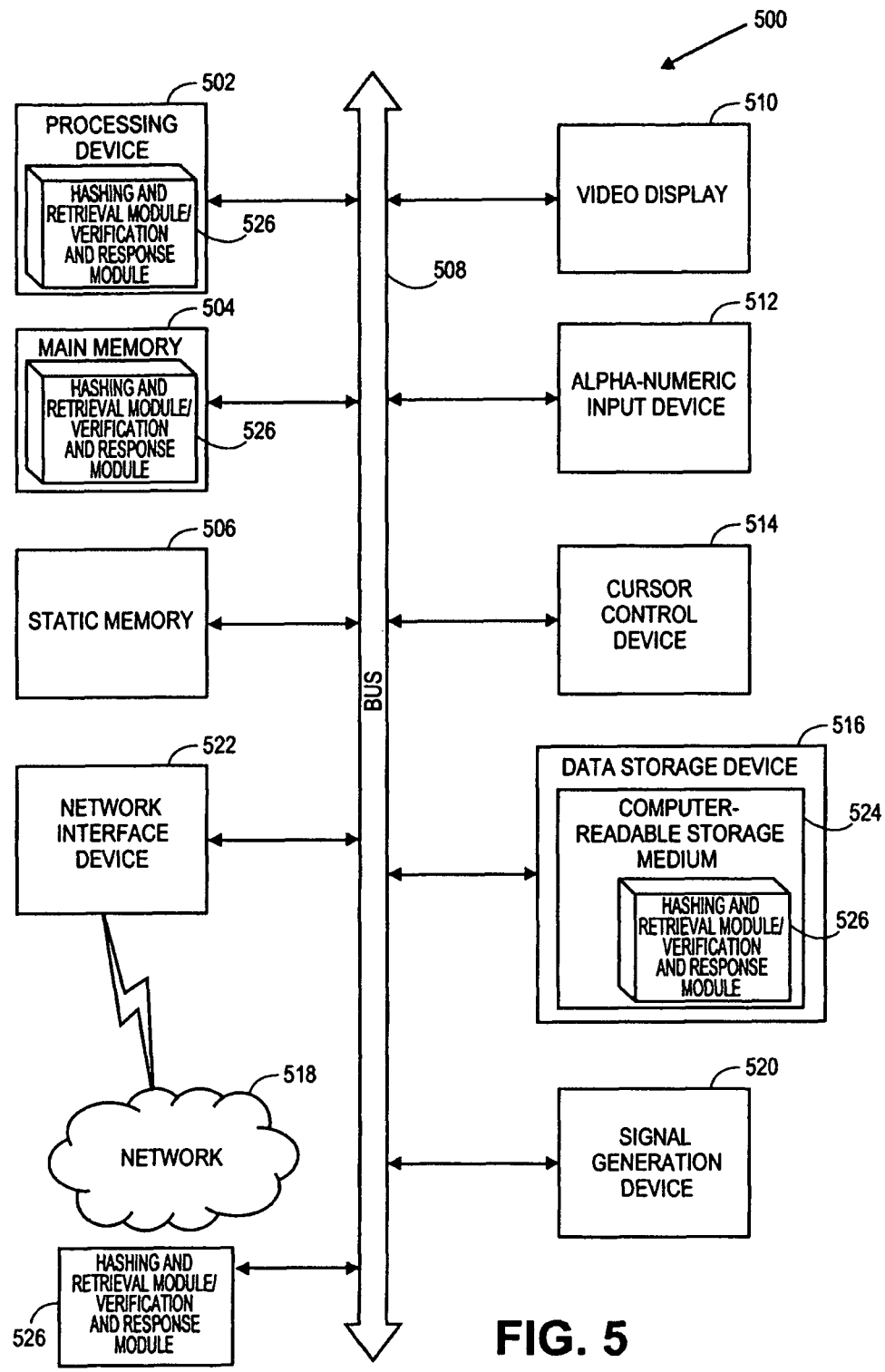
FIG. 5 is a diagram of one embodiment of the data retrieval system.

FIG. 5 is a diagram illustrating one embodiment of a data retrieval system. Within the computer system 500 is a set of instructions for causing the computer or other machine to perform any one or more of the methodologies discussed herein. In alternative embodiments, the computer system 500 may be connected (e.g., networked) to other machines in a LAN, an intranet, an extranet, or the Internet. The computer system 500 can operate in the capacity of a server or a client machine (e.g., a client computer executing the hashing and retrieval module or a server computer executing a verification and response module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computer or other machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable medium), which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 502 may also be one or more special-purpose processing devices such as an application specific integrated circuit (ASIC), a field programmable gate array (FPGA), a digital signal processor (DSP), network processor, or the like. The processing device 502 is configured to execute the hashing and retrieval module or verification and response module 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., the hashing and retrieval module or verification and response module 526) embodying any one or more of the methodologies or functions described herein. The hashing and retrieval module or verification and response module 526 may also reside, completely or at least partially, within the main memory 504 and/or within the processing device 502 during execution thereof by the computer system 500, the main memory 504 and the processing device 502 also constituting machine-readable storage media. The hashing and retrieval module or verification and response module 526 may further be transmitted or received over a network 518 via the network interface device 522.

The machine-readable storage medium 524 may also be used to store the hashing and retrieval module or verification and response module 526 persistently. While the machine-readable storage medium 526 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "generating," "receiving," "retrieving," "comparing," "returning," "calculating" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in micro-coded hardware components.

Thus, a method and apparatus for data retrieval has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a client device, an indicator of a portion of a file to access, wherein the portion comprises a segment of the file that is less than a whole of the file;
   generating, by a processing device of the client device, a hash value for a portion of the file calculated from of a local copy of the portion of the file in view of the indicator, wherein the hash value is generated using a shared seed, wherein the shared seed is pre-set by the client device and is shared between the client device and a server device;
   generating, by the processing device of the client device, a request for a remote copy of the portion of the file, wherein the request comprises a uniform resource indicator (URI) of the file, a byte range identifier, and the hash value for the portion of the file, wherein the byte range indicator identifies the portion of the file that the hash value was calculated from, and further wherein the request is sent in a selected transfer protocol that is shared between the server device and the client device;
   determining, by the client device in view of the selected transfer protocol, whether an acknowledgement of the request has been received from the server device, wherein a format and content of the acknowledgement are in view of the selected transfer protocol, and wherein failure to receive the acknowledgement indicates that the local copy of the portion of the file is current;
   receiving, by the client device, a response to the request, the response comprising the URI of the file and the byte range identifier from the server device indicating the remote copy of the portion of the file matches the local copy of the portion of the file in response to a determination, made by the server device, that a comparison between the hash value and a remote hash value indicates the local copy of the portion of the file matches the remote copy of the portion of the file, wherein the remote hash value was generated by the server device using the shared seed, and wherein the response is sent in the selected transfer protocol; and
   causing meta data of a local storage device to be updated to indicate that the local copy of the portion of the file has been verified as current.

2. The method of claim 1, wherein the request is a hypertext transfer protocol request.

3. The method of claim 1, further comprising:
   receiving the portion of the file in response to a non-matching comparison of the hash value with the remote hash value for the remote copy of the portion of the file.

4. A method comprising:
   receiving, by a processing device of a server device, a request from a client device for a portion of a server copy of a data file, wherein the portion comprises a segment of the data file that is less than a whole of the data file and wherein the request comprises a uniform resource indicator (URI) of the file, a byte range indicator, and a first hashing value calculated from a corresponding portion of a client copy of the data file, wherein the byte range indicator identifies the portion of the data file that the first hashing value was calculated from, and further wherein the request is sent in a selected transfer protocol that is shared between the server device and the client device, wherein the first hashing value is calculated using a shared seed;
   retrieving, by the server device, the portion of the server copy of the data file from a storage device in view of the request;
   generating, by the server device, a second hashing value from the portion of the server copy of the data file in view of the byte range indicator identifying the portion of the data file using the shared seed;
   comparing, by the server device, the first hash value and the second hash value;
   transmitting, by the server device, an acknowledgement to the client device that the request has been received, wherein a format and content of the acknowledgement are in view of the selected transfer protocol, and wherein failure to transmit the acknowledgement indicates that the corresponding portion of the client copy of the data file is current;
   returning, by the server device, the portion of the data file in response to the comparison indicating that the local copy of the portion of the data file matches the remote copy of the portion of the data file; and
   returning, by the processing device of the server device, a response to the request, the response comprising the URI of the file and the byte range indicator, the response indicating the portion of the data file has not changed in response to the comparison of the first hash value and second hash value indicating that the local copy of the portion of the data file matches the remote copy of the portion of the data file, wherein the response is returned using the selected transfer protocol, and wherein returning the response causes the client device to update meta data of a local storage device to indicate that the local copy of the portion of the data file has been verified as current.

5. The method of claim 4, wherein the request is a hyper-text transfer protocol request.

6. The method of claim 4, further comprising:
using alternate or multiple hash seeds to generate the second hashing value.

7. A non-transitory computer-readable storage medium having stored therein a set of instructions, which when executed cause a processing device to:
receive, by the processing device, a uniform resource indicator (URI) of a portion of a file to access, wherein the portion comprises a segment of the file that is less than a whole of the file;
generate, by the processing device, a hash value calculated from a local copy of the portion of the file, in view of the URI indicator, wherein the hash value is generated using a shared seed, wherein the shared seed is pre-set by the client device and is shared between the client device and the server;
generate, by the processing device, a request for a remote copy of the portion of the file, wherein the request comprises the URI indicator of the file, a byte range identifier, the hash value for the portion of the file, wherein the byte range indicator identifies the portion of the file that the hash value was calculated from, and further where in the request is sent in a selected transfer protocol that is shared between the server device and the client device;
determine whether an acknowledgement of the request has been received from the server, wherein a format and content of the acknowledgement are in view of the selected transfer protocol, and wherein failure to receive the acknowledgement indicates that the local copy of the portion of the file is current;
receive, by the processing device, a response to the request, the response comprising the URI of the file and the byte range identifier, the response indicating the remote copy of the portion of the file matches the local copy of the portion of the file in response to a determination, made by the server device, that a comparison between the hash value and a remote hash value indicates that the local copy of the portion of the file matches the remote copy of the portion of the file, wherein the remote hash value was generated by the server device using the shared seed, and wherein the response is sent in the selected transfer protocol; and
cause meta data of a local storage device to be updated to indicate that the local copy of the portion of the file has been verified as current.

8. The non-transitory computer-readable storage medium of claim 7, wherein the request is a hypertext transfer protocol request.

9. The non-transitory computer-readable storage medium of claim 7, the processing device further to:
receive the portion of the file in response to a non-matching comparison of the hash value with the remote hash value generated from the remote copy of the portion of the file.

10. The non-transitory computer-readable storage medium of claim 7, the processing device further to:
alternate or using multiple hash seeds to generate the hash value.

11. A non-transitory computer-readable storage medium having stored therein a set of instructions, which when executed cause a processing device of a server device to:
receive, by the processing device, a request from a client device for a portion of a server copy of a data file, wherein the portion comprises a segment of the data file that is less than a whole of the data file and wherein the request comprises a uniform resource indicator (URI) of the data file, a byte range indicator, and a first hashing value calculated from a corresponding portion of a client copy of the data file, wherein the byte range indicator identifies the portion of the file that the first hashing value was calculated from, and further wherein the request is sent in selected transfer protocol that is shared between the server device and the client device wherein the first hashing value is generated using a shared seed;
retrieve, by the processing device, the portion of the server copy of the data file from a storage device in view of the request;
generate, by the processing device, a second hashing value from the portion of the server copy of the data file in view of the byte range indicator identifying the portion of the data file in view of the shared seed;
compare, by the processing device, the first hashing value and the second hashing value;
transmit an acknowledgement to the client device that the request has been received, wherein a format and content of the acknowledgement are in view of the selected transfer protocol, and wherein failure to transmit the acknowledgement indicates that the corresponding portion of the client copy of the data file is current;
return, by the processing device, the portion of the file in response to the comparison indicating that the local copy of the portion of the data file matches the remote copy of the portion of the data file; and
return, by the processing device, a response to the request, the response comprising the URI of the data file and the byte range indicator, the response indicating the portion of the data file has not changed in response the comparison of the first hash value and second hash value indicating that the local copy of the portion of the data file matches the remote copy of the portion of the data file, wherein the response is returned using the selected transfer protocol, and wherein return of the response causes the client device to update meta data of a local storage device to indicate that the local copy of the portion of the data file has been verified as current.

12. The non-transitory computer-readable storage medium of claim 11, wherein the request is a hyper-text transfer protocol request.

13. The non-transitory computer-readable storage medium of claim 11, the processing device further to:
use alternate or multiple hash seeds to generate the second hashing value.

14. An apparatus comprising:
a memory; and
a processing device of a server device, operatively coupled to the memory, to:
receive a request from a client device for a portion of a file, wherein the portion comprises a segment of the file that is less than a whole of the file and wherein the request comprises a uniform resource indicator (URI) of the file, a byte range indicator, and a first hash value calculated from a client copy of the portion of the file, wherein the byte range indicator identifies the portion of the file that the first hashing value was calculated from, and further where the request is sent in a selected transfer protocol that is shared between the server device and the client device, wherein the first hash value is calculated using a shared seed; and generate a second hash value of a server copy of the portion of the file in view of the shared seed;

check the first hash value against the second hash value;

transmit an acknowledgement to the client device that the request has been received, wherein a format and content of the acknowledgement are in view of the selected transfer protocol, and wherein failure to transmit the acknowledgement indicates that the client copy of the portion of the file is current; and return a response to the request, the response comprising the URI of the file and the byte range indicator, the response indicating the portion of the file has not changed in response to a comparison of the first hash value against the second hash value indicating that the local copy of the portion of the file matches the remote copy of the portion to the file, wherein the response is returned using the selected transfer protocol, and wherein the return of the response indicating that the local copy of the portion of the file matches the remote copy of the portion of the file causes the client device to update meta data of a local storage device to indicate that the local copy of the portion of the file has been verified as current.

15. The apparatus of claim 14, wherein the request is a hypertext transfer protocol request.

16. The apparatus of claim 14, wherein the processing device is further to return the portion of the file in response to a non-matching comparison of the hash value from the request and the hash value of the server copy.

17. The method of claim 1, wherein the request further comprises a type of hashing function used to calculate the hash value of the local copy of the portion of the file.

18. The method of claim 17, wherein the server device uses the type of hashing function to select a hashing function used to calculate the remote hash value.

\* \* \* \* \*